US006862780B2

(12) United States Patent
Henry

(10) Patent No.: US 6,862,780 B2
(45) Date of Patent: Mar. 8, 2005

(54) CLAMPS

(75) Inventor: Roger John Wilton Henry, Cheltenham (AU)

(73) Assignee: Arnos Australia PTY LTD, Cheltenham (AU)

(*) Notice: Subject to any disclaimer, the term of this patent is extended or adjusted under 35 U.S.C. 154(b) by 171 days.

(21) Appl. No.: 10/181,680

(22) PCT Filed: Jan. 15, 2001

(86) PCT No.: PCT/AU01/00036

§ 371 (c)(1), (2), (4) Date: Dec. 13, 2002

(87) PCT Pub. No.: WO01/53705

PCT Pub. Date: Jul. 26, 2001

(65) Prior Publication Data

US 2003/0101550 A1 Jun. 5, 2003

Related U.S. Application Data

(63) Continuation-in-part of application No. PCT/AU01/00036, filed on Jan. 15, 2001, now abandoned.

(30) Foreign Application Priority Data

Jan. 17, 2000 (AU) .............................................. PQ5099
Jul. 25, 2000 (AU) .............................................. PQ8989
Jan. 23, 2002 (AU) .......................................... PS0114/02

(51) Int. Cl.[7] .............................. F16B 2/18; B42F 1/00
(52) U.S. Cl. ............................ 24/536; 24/67.1; 211/48
(58) Field of Search ......................... 24/536, 67.1, 517, 24/516, 513, 494, 492, 490, 331, 330, 333, 67.7; 211/48, 45; 294/116

(56) References Cited

U.S. PATENT DOCUMENTS

| | | | | | |
|---|---|---|---|---|---|
| 1,397,930 | A | * | 11/1921 | Jefferies | 294/116 |
| 1,911,277 | A | * | 5/1933 | Helmer | 24/67.1 |
| 2,990,961 | A | * | 7/1961 | Kain | 211/48 |
| 3,014,258 | A | * | 12/1961 | Pearl | 24/515 |
| 3,221,892 | A | | 12/1965 | Morcheles et al. | |
| 3,308,831 | A | * | 3/1967 | Kritske | 24/67.1 |
| 3,364,528 | A | * | 1/1968 | Fletcher | 24/67.1 |
| 3,891,093 | A | | 6/1975 | Petrie | |
| 3,896,526 | A | | 7/1975 | Joiner | |
| 4,147,257 | A | * | 4/1979 | Zippel | 211/45 |
| 4,836,389 | A | | 6/1989 | Poulton | |
| 4,921,506 | A | | 5/1990 | Poulton | |
| 5,590,765 | A | | 1/1997 | London | |

* cited by examiner

*Primary Examiner*—Robert J. Sandy
(74) *Attorney, Agent, or Firm*—Knobbe, Martens, Olson & Bear, LLP

(57) ABSTRACT

A clamp for clamping sheets and like material has opposed elongate clamping jaws mounted for pivotal movement between a clamping condition and a relatively open, released, condition, and a latch device for effecting movement of the jaws. The latch device comprises a member of channel section within which an upper part of the jaws is mounted whereby opposite sides of the member co-operate with the two jaws, and latch levers pivotal between a stable latched position and a released position. The latch levers are linked to the jaws by a screw mechanism and co-operate with the member of channel section such that movement of the latch levers to their released position effects relative movement between the jaws and said member to enable opening of the jaws. Adjustment of the clamped and open conditions of the jaws is effected by rotation of the latch levers about the axis of the screw mechanism.

26 Claims, 11 Drawing Sheets

CLAMPS

This application is a continuation-in-part of the International Application PCT/AU01/00036 filed 15 Jan. 2001, now abandoned, and claims the benefit of the Australian provisional patent application PS0114/02 filed 23 Jan. 2002. The International Application PCT/AU01/00036 claimed priority to Australian provisional patent applications PQ8989/00, filed 25 Jul. 2000 and PQ5099/00 filed 17 Jan. 17, 2000.

BACKGROUND OF THE INVENTION

1. Field of the Invention

The present invention relates to clamps and more particularly to clamps for releasably holding the edge portions of articles of sheet-like form, such as plans and drawings, for convenient storage and ready access.

2. Description of the Prior Art

Clamps for storing engineering or architectural plans and drawings and other sheet-like particles such as samples of fabric or carpet, typically comprise two elongate opposed jaws pivotally mounted to grip and release the edge portions of the sheet material by operation of screw devices comprising bolts and wing nuts. In use, the clamp extends horizontally and is removably mounted on associated support structure, for example horizontally extending suspension bars, so that the sheet material held by the clamp hangs downwardly from the clamp, the clamp being removable from the support structure to provide access to the stored material when required. The clamp may include a handle to facilitate placement and removal of the clamp relative to the support structure.

The use of screw devices comprising screws and wing nuts to open and close the jaws of the clamp is not particularly convenient as several turns of each wing nut may be required to achieve the requisite opening or closing movement of the jaws. In addition, certain previously proposed forms of clamp incorporating a handle do not always provide a convenient means of mounting the handle or of readily adjusting the position of the handle to suit different forms of support system.

SUMMARY OF THE INVENTION

According to one aspect of the present invention, there is provided a clamp for clamping sheets and like material, said clamp comprising opposed elongate clamping jaws mounted for pivotal movement between a clamping condition and a relatively open, released, condition, and a latch device for effecting movement of the jaws, said latch device comprising a member of channel section within which an upper part of the jaws is mounted whereby opposite sides of the member co-operate with the two jaws, and a latch lever pivotal between a stable latched position and a released position, said latch lever being linked to the jaws and co-operating with the member of channel section such that movement of the latch lever to its released position effects relative movement between the jaws and said member to enable opening of the jaws, said latch device also having means enabling adjustment of the clamped and open conditions of the jaws.

Advantageously, the jaws are subject to a spring bias to move the jaws in an opening direction when the latch lever is moved out of its latched position.

In a preferred embodiment of the invention there are two such latch devices spaced along the length of the jaws, with the member of channel section being common to both latch devices and extending along substantially the entire length of the clamp.

Particularly advantageously, the member of channel section also provides a slidable mounting for components such as a handle and stops to enable ready adjustment of the mounting positions of such components. For this purpose, a head section of the member may be of an undercut or other profile adapted for slidable engagement with a corresponding profile of a mounting part of a component to be engaged therewith.

In a preferred embodiment, to enable adjustment of the clamping and open conditions of the jaws, the latch lever is linked to the jaws by means of a bolt with which a part of the latch lever is in threaded engagement. When in its released position, rotation of the latch lever about the axis of the bolt will result in adjustment of the position of the bolt and thereby in the relative position between the jaws and the member of channel section. In this form of embodiment, the pivotal movement of the latch lever between its latched and released positions is about an axis at right angles to the axis of the bolt.

Advantageously, the released position of the latch lever is also a stable position of the lever, with the latch lever moving through an over-centre position during passage between its latched and released positions.

Advantageously, when the latch lever is in its latched position it is capable of rotation about the axis of the bolt to effect final tightening of the jaws.

In the preferred embodiment, the latch lever includes an internally-threaded sleeve with which the shank of the bolt is engaged, the sleeve being pivotally mounted to a body of the latch lever for pivotal movement about an axis transverse to the axis of the threaded sleeve whereby the latch lever is able to pivot about said transverse axis for movement between its latched and released positions.

According to another aspect of the invention, there is provided a clamp for clamping sheets and like material, said clamp comprising opposed elongate clamping jaws mounted for pivotal movement between a clamping condition and a relatively open, released, condition, and a latch device for effecting movement of the jaws, the latch device comprising a member of channel section within which an upper part of the jaws is mounted whereby opposite sides of the member cooperate with the two jaws, and latch levers each pivotal between a stable latched position and a released position, the latch levers each being linked to the jaws by a respective screw mechanism and co-operating with the member of channel section such that movement of the latch levers to their released positions effects relative movement between the jaws and said member to enable opening of the jaws, the clamped and open conditions of the jaws being adjustable by rotation of the latch levers to cause adjustment of the respective screw mechanisms.

According to yet another aspect of the invention, there is provided a clamp for clamping sheets and like material, said clamp comprising opposed elongate clamping jaws mounted for pivotal movement between a clamping condition and a relatively open, released, condition, and a latch device for effecting movement of the jaws, said latch device comprising a latch lever pivotal between a stable latched position and a released position, said latch lever being linked to the jaws such that relatively small pivot movement of the latch lever is amplified into larger movement of the jaws, said latch device being adjustable to accommodate variation in the thickness of material to be clamped and to permit variation of clamping pressure.

According to yet another aspect of the present invention, there is provided a clamp for clamping sheets and like material, said clamp comprising opposed elongate clamping jaws mounted for pivotal movement between a clamping condition and a relatively open, released condition, and means for effecting movement of the jaws, wherein one of the jaws extends outwardly to a position substantially beyond a clamping end portion of the other jaw to provide a guide surface along which material to be loaded into the clamp can slide in order to facilitate loading.

In a preferred embodiment, the guide surface may be substantially planar although a slight curvature in transverse cross-section and concave in relation to the clamping end portion of the other clamping jaw would be feasible. The configuration is such that in a fully closed condition of the jaws with the clamping portions of the two jaws substantially in engagement without the presence of sheet material therebetween the extension is directed laterally across and transversely beyond the clamping end portion of the other jaw. The length of the extension beyond the clamping end portion of the jaw of which it forms a part is such that a stack of sheets such as typically used for engineering drawings and architectural plans can be assembled with an edge portion resting on the extension prior to movement between the clamping end portions or the extension can act as a scoop to guide such end portions between the open jaws; a length of approximately 15 mm to 20 mm, is suitable for the purpose.

It will therefore be understood that unlike the position with prior clamps of this type in which the two jaws are substantially identical and symmetrical with reference to a central clamping plane, the presence of the extension on one of the two jaws provides a distinct asymmetry of the two jaws.

BRIEF DESCRIPTION OF THE DRAWINGS

An embodiment of the invention will now be described, by way of example only, with reference to the accompanying drawings in which.

DESCRIPTION OF THE PREFERRED EMBODIMENTS

Figure 2:
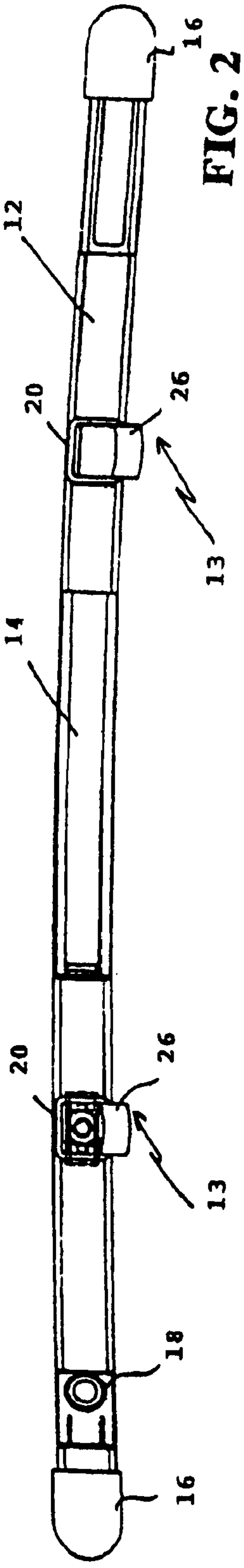
FIG. 2 is a plan view of the clamp.
Figure 1:
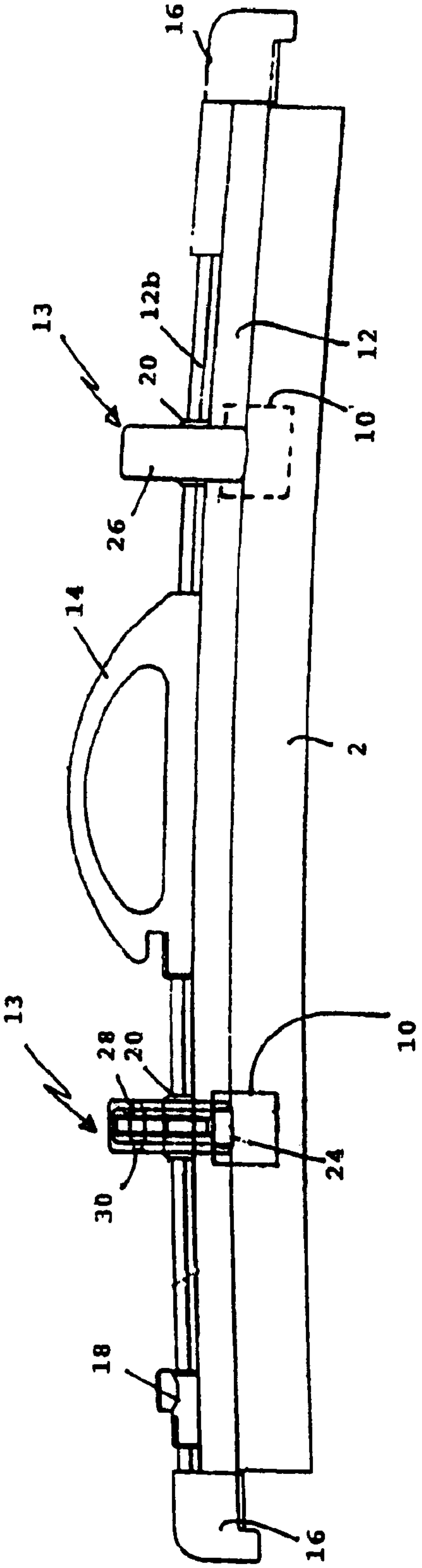
FIG. 1 is a side view of a clamp in accordance with one embodiment of the invention.

In accordance with a first embodiment of the invention (FIGS. 1 to 7), a clamp for holding and storing sheets and like material such as drawings, plans, brochures, fabric samples, and carpet samples, comprises elongate opposed clamping jaws 2, 4 each in the form of an extrusion of constant cross section. The jaws 2, 4 are mounted for pivotal movement one relative to the other by engagement of a projection 6 of substantially circular cross section extending along an upper edge portion of the jaw 2 within a channel 8 of similar cross section extending along the upper edge portion of the jaw 4. The jaws 2, 4 are biased to an open position by a pair of springs 10 of plate-like form mounted at spaced positions along the length of the clamp, with each spring 10 being mounted in the interior of the clamp and having a pair of opposed legs 10*a* resiliently biased apart and engaging the inner surfaces of the two jaws 2,4 in order to pivotally bias the jaws 2, 4 apart.

The two jaws 2, 4 are associated with an elongate mounting channel 12 extending the length of the clamp. The mounting channel 12 consists of an extrusion of substantially C-shaped cross section lying above the two jaws 2, 4 so that the jaws extend partially into the interior of the channel 12 with lower edge portions 12*a* of the channel 12 engaging the outer sides of the two jaws 2,4 as clearly shown in FIGS. 3 and 4. The two jaws 2,4 are so profiled that the lower edge portions of the channel 12*a* engage an outwardly inclined surface of the associated jaw so that relative movement between the jaws 2, 4 and the channel 12 in a sense to draw the two jaws 2, 4 upwardly relative to the channel 12 will cause the lower edge portions 12*a* of the channel to pivot the jaws progressively inwardly to a closed clamping condition against the bias of the springs 10. This closing movement of the jaws and subsequent opening movement is effected by means of latch devices 13 which will be described subsequently. The two clamping jaws 2,4, are shaped so that clamping is effected by application of clamping pressure between the lower ends of the two jaws, specifically by the incorporation of internal clamping beads 2*a*,4*a* at the lower ends of the two jaws and extending the length of the jaws.

The upper part of the mounting channel 12 includes two opposed grooves whereby the upper part forms a head section 12*b* of undercut profile. The head section 12*b* provides a mounting for associated components such as a handle 14, end caps 16 and associated index tags, a stop button 18 for interaction with associated support structure on which the clamp is mounted in use, and mounting blocks 20 for the latch devices 13. In each case the associated component to be mounted on the head section 12*b* comprises a base part having on its underside a groove of corresponding section to the head section 12*b* of the mounting channel 12 whereby the component can be engaged with the channel by sliding the base part along the head section from one end with the head section engaged with the groove. This engagement is specifically shown in relation to the latch mounting blocks 20 in FIGS. 3 and 4. It will be understood that this type of mounting system provides an infinitely adjustable mounting for components such as the handle and stop button which can be slid along the head section to a selected position to be secured in that position by the simple expedient of a grub screw or the like in the base part of the component and tightened into engagement with the head section 12*b* of the mounting channel 12. Alternatively the head section 12*b* may be formed with a series of holes or other recesses longitudinally spaced with the base portion of the component including an integrally-moulded projection adapted for snap-in engagement with a selected one of the recesses in order to locate the component.

Figure 4:
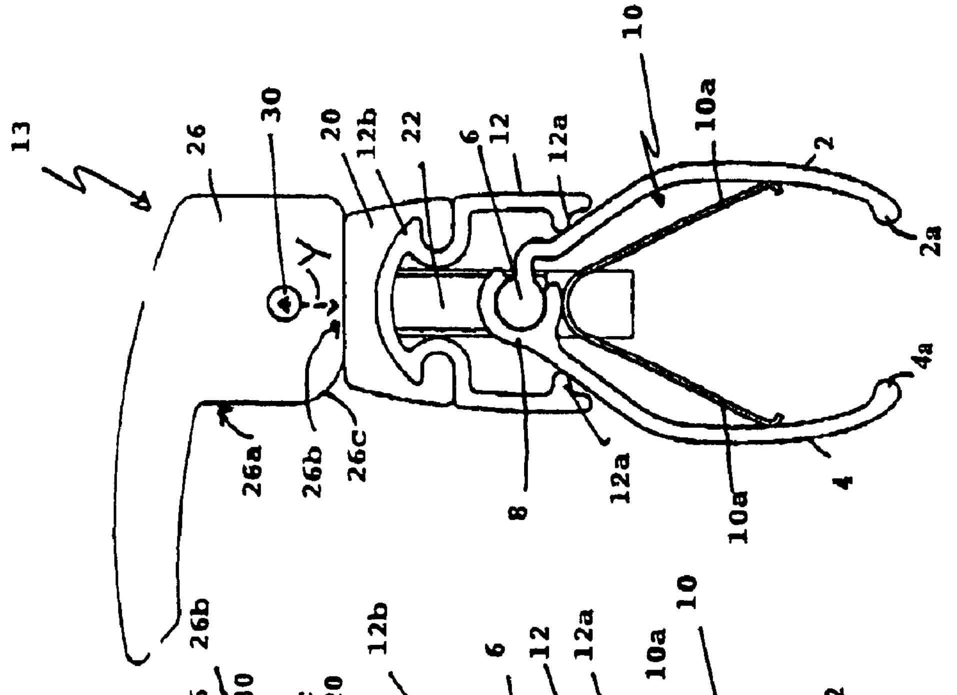
FIG. 4 is a cross section similar to FIG. 3 but showing the jaws in their open condition.

Each of the latch devices 13 consists of a mounting block 20 engaged with the head section 12*b* of the mounting channel 12 as previously described. A bolt 22 having a head 24 located in the interior of the two jaws 2, 4 immediately beneath the zone of their pivotal connection 6, 8 extends upwardly through a hole in the upper edges of the two jaws 2, 4 and a vertical passage in the mounting channel 12 and block 20 into the interior of a latch lever 26 mounted above the block 20. A nut 28 mounted on the shank of the bolt 22 within the interior of the latch lever 26 is coupled to the latch lever 26 by means of a pivotal connection 30 at right angles to the axis of the bolt 22. In this manner, the latch lever 26 is able to pivot vertically about the horizontal pivot connection 30 between an engaged or latched position shown in FIGS. 3 and 5 in which the handle of the lever 26 extends downwardly to lie along the side of the mounting block 20 and mounting channel 12, and a released position as shown in FIG. 4 in which the handle of the lever 26 extends substantially horizontally. Conveniently, the latch bolt 22 is also used to mount a respective one of the two biasing springs 10 and for this purpose an upper part of the spring 10 is formed with a hole through which the shank of the bolt 22 passes, with the upper part of the spring 10 being held captive between the head of the bolt 24 and the underside of the zone of pivotal connection of the two jaws, as illustrated in FIGS. 3 and 4.

Figure 3:
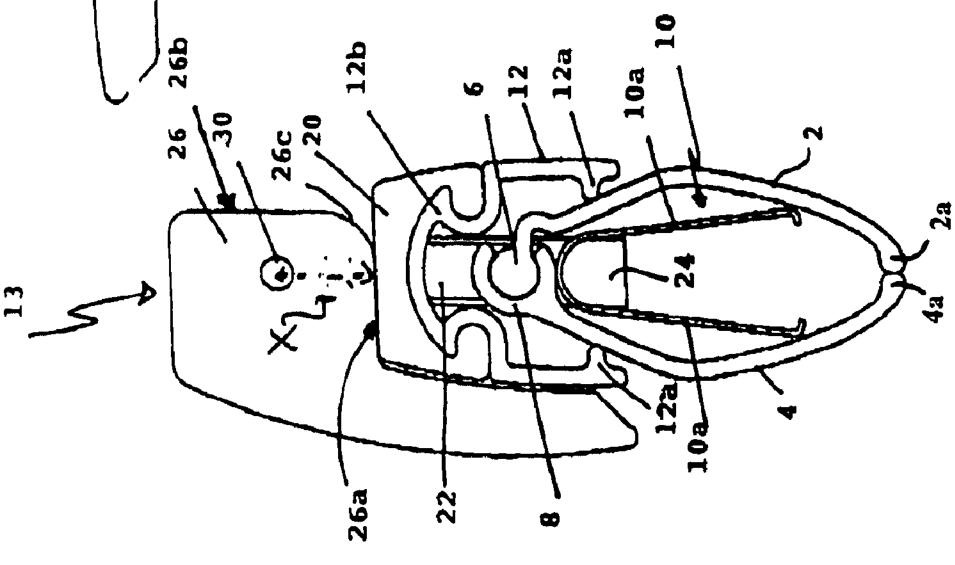
FIG. 3 is a cross section through a latch device of the clamp showing the configuration when the jaws of the clamp are in their closed or clamping condition.
Figure 5:
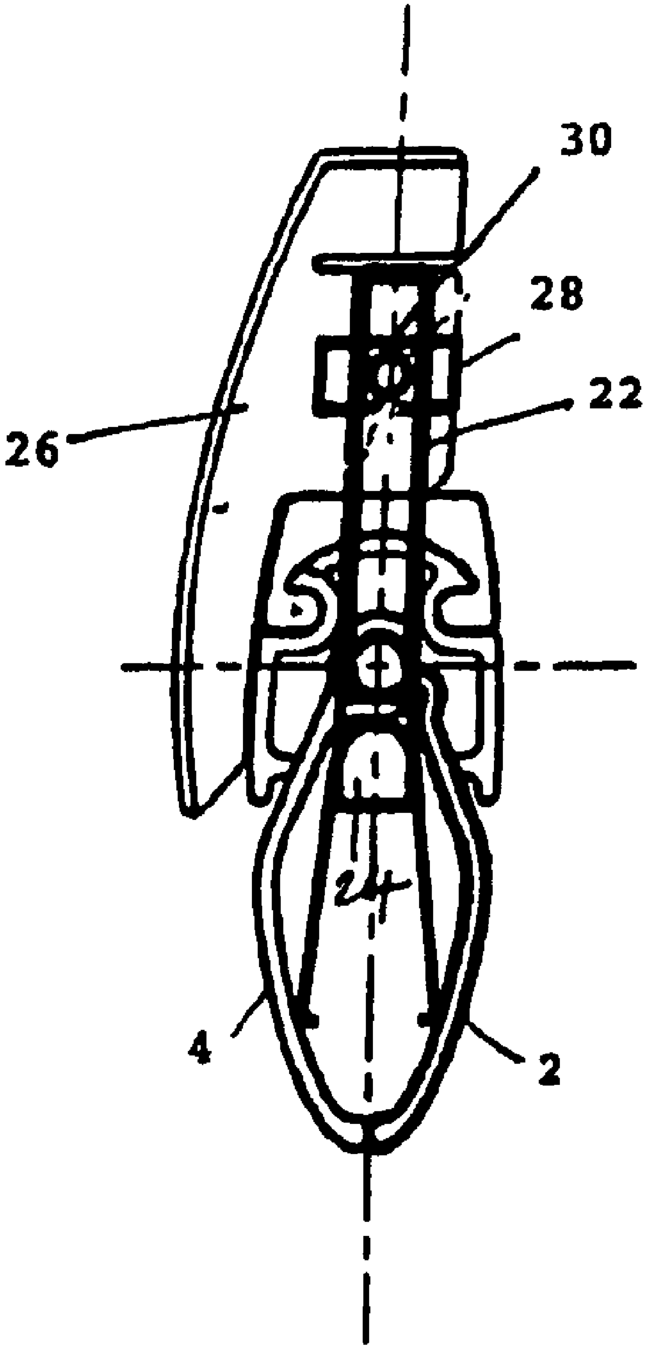
FIG. 5 is a fragmentary section similar to FIG. 3 showing interior detail of the latch device.

It will be noted that in the engaged position of FIG. 3, a lower surface 26*a* of the main body of the latch lever 26 in that position is engaged with the upper surface of the mounting block 20 and in that position the distance X between the pivot connection 30 and that surface is such that the lever 26 has, via the head 24 of the bolt 22, drawn the jaws 2, 4 upwardly into the channel 12 to an extent whereby the interaction between the lower edge portions 12*a* of the channel 12 and the jaws 2, 4 have caused the jaws to be in a closed clamping condition. In contrast, when the latch lever 26 is in the released position of FIG. 4, a surface 26*b* of the main body portion of the latch lever 26 at right angles to the surface 26*a* is in contact with the upper surface of the mounting block 20 and in this position the distance Y between the pivot connection 30 and the surface is less than the distance X; as a result the bolt 22 and the jaws 2, 4 are located in a lower position relative to the channel 12 than in the engaged position of the latch lever 26 whereby as a result of the interaction between the jaws 2, 4 and the lower edge portions 12*a* of the channel 12 under the spring bias the jaws 2, 4 are able to move to an open, released, condition. It will therefore be understood that all that is required to move the jaws from their closed, clamping, condition to their open, released, condition is to swing the latch levers 26 through 90° from their engaged to their released positions, with the reverse movement being made to effect subsequent clamping. The two surfaces 26*a*, 26*b* of the main body of each latch lever 26 are interconnected by a radius 26*c* which acts as a cam surface which interacts with the upper surface of the mounting block 20 during this pivotal movement of the latch lever 26, to thereby cause the raising and lowering movement of the bolt 22 and hence of the jaws relative to the channel. The action of the latch lever 26, due to the spring bias of the jaws is, essentially, an over-centre action, with the latch lever 26 being in a stable position when in its engaged position and when in its released position.

It is to be noted that the two jaws 2, 4 will pivot uniformly relative to a vertical plane from their closed to their open conditions and vice versa, upon movement of the latch levers 26.

Figure 6:
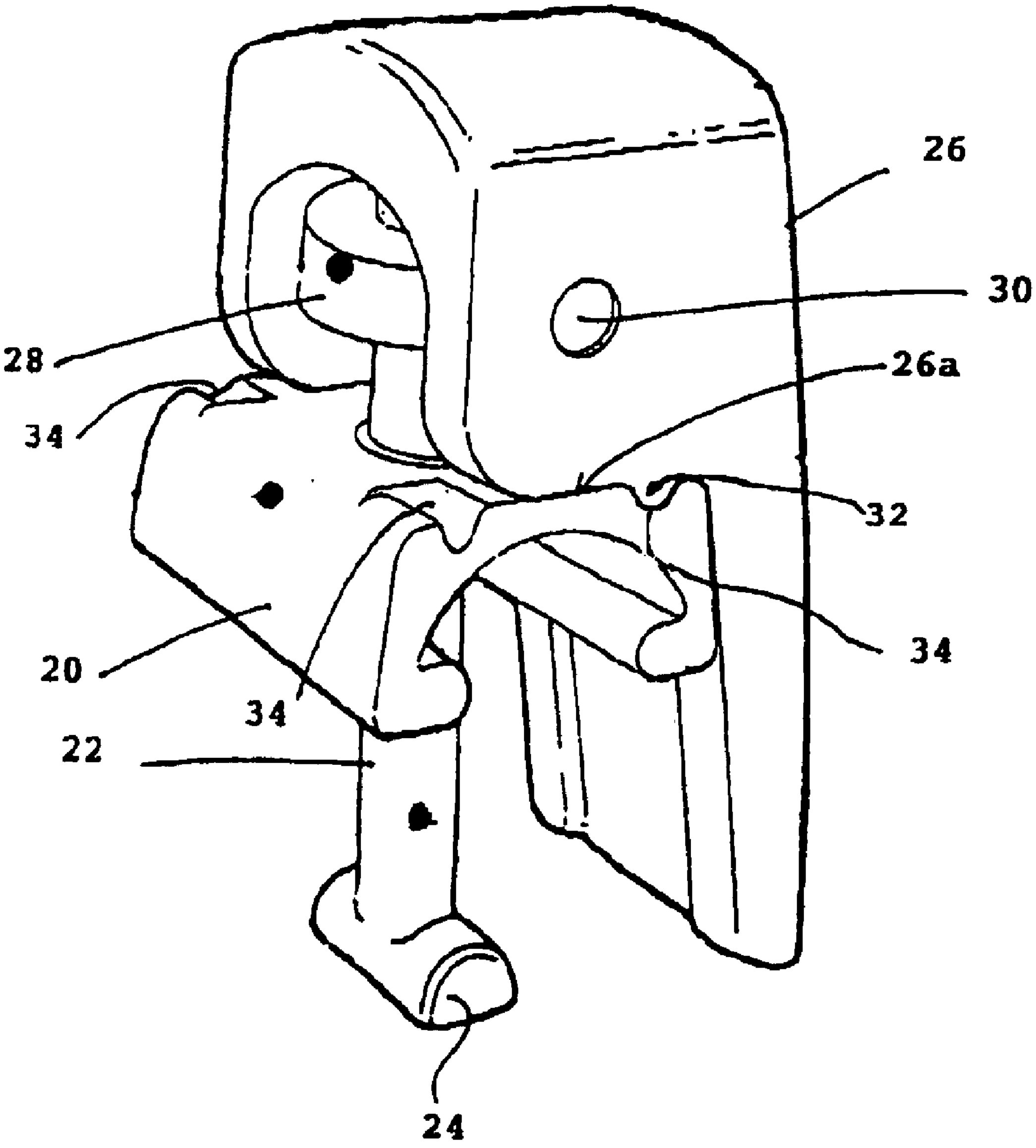
FIG. 6 is an enlarged view of the latch device showing the incorporation of a lock for locking the latch lever against accidental release when in its engaged condition.

The downwards extension of the handle of the latch lever 26 along the side of the mounting block 20 and channel 12 in the engaged position provides a compact configuration which is unlikely to be susceptible to accidental release. However further security against accidental release may be provided by incorporating a snap-in detent between the latch handle and mounting block 20 or channel 12 in order to provide a more positive lock for the latch lever 26 when in its engaged condition. FIG. 6 illustrates in detail one method for achieving the positive lock for the latch lever 26 in its engaged position. As shown in FIG. 6, a lug 32 projecting from the surface 26*a* of the main body portion of the latch lever 26 engages, with a snap-in action, into a recess 34 formed in the upper surface of the mounting block 20 when the latch lever 26 is pivoted into its engaged position; one such lug 32 and corresponding recess 34 is provided at each side of the latch lever 26. The presence of the second pair of recesses 34 visible in FIG. 6 provides a second alternative stable engaged position for the latch lever 26 following adjustment, as will be described below.

Figure 7:
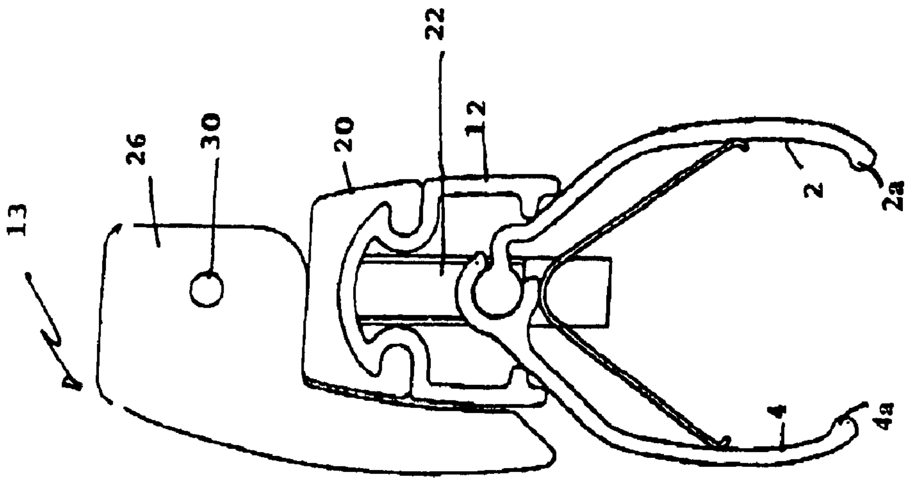
FIG. 7 is a section corresponding to FIG. 3 but showing the closed condition of the jaws following adjustment effected by rotation of the latch lever.

The latch devices 13 also provide substantial facility for adjustment of the closed and open conditions of the jaws 2, 4 to accommodate a range of different thicknesses of material to be clamped and a range of different clamping pressures. This is achieved by moving the latch lever 26 to the released position of FIG. 4 and then rotating the lever 26 about the axis of the bolt 22. This will result in relative displacement between the nut 28 and bolt 22 which will cause a change in the spacing between the jaws 2, 4 in their open condition due to displacement of the bolt 22 and hence the jaws 2, 4 relative to the channel 12. By rotating the latch lever 26 anti-clockwise from the open position shown in FIG. 4, the bolt 22 will be displaced downwardly to provide a progressively increasing open condition and a commensurately wider spaced closed or clamping condition. FIG. 7 illustrates by way of example a position towards the extreme of adjustment in which the jaws 2, 4 are set to clamp, for example, a thick set of drawings. It is to be noted that in the engaged position, the latch lever 26 can be located at either side of the block 20 and therefore the incremental adjustment of the jaws 2, 4 is obtained by rotation of the latch lever 26 through 180°, equivalent to half of the bolt thread pitch whereby relatively fine incremental adjustment can be achieved.

Figure 8:
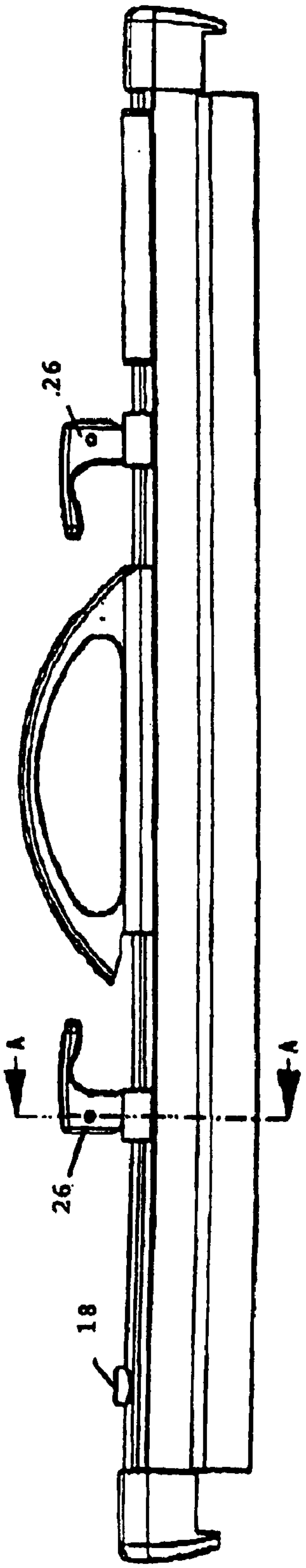
FIG. 8 is a side view of a clamp in accordance with another embodiment of the invention showing the configuration when the jaws of the clamp are in their closed or clamping condition.
Figure 9:
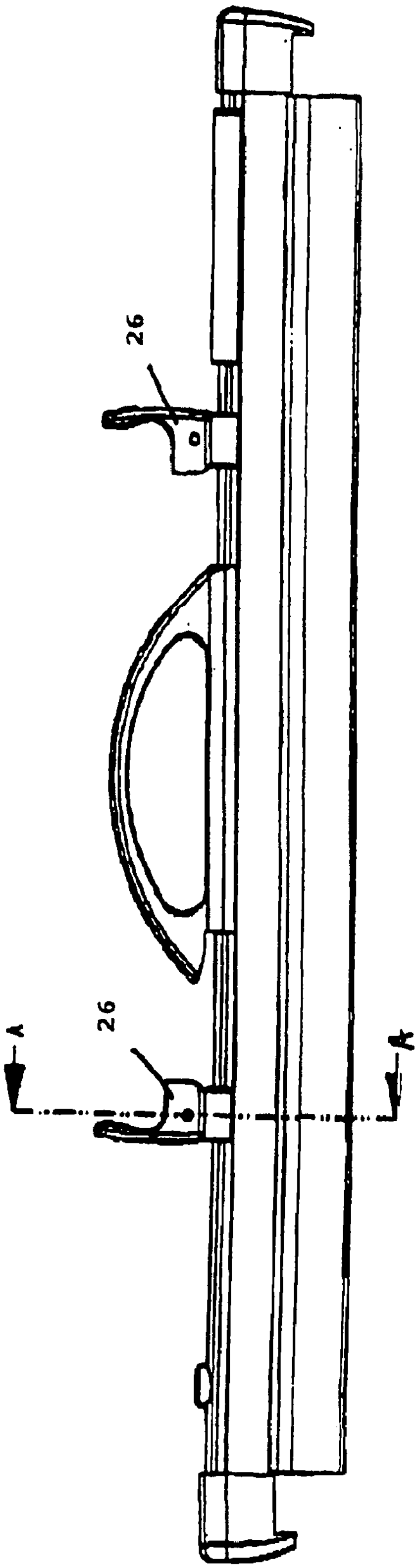
FIG. 9 is a side view corresponding to FIG. 9 but showing the configuration when the jaws are in their open condition.
Figure 10:
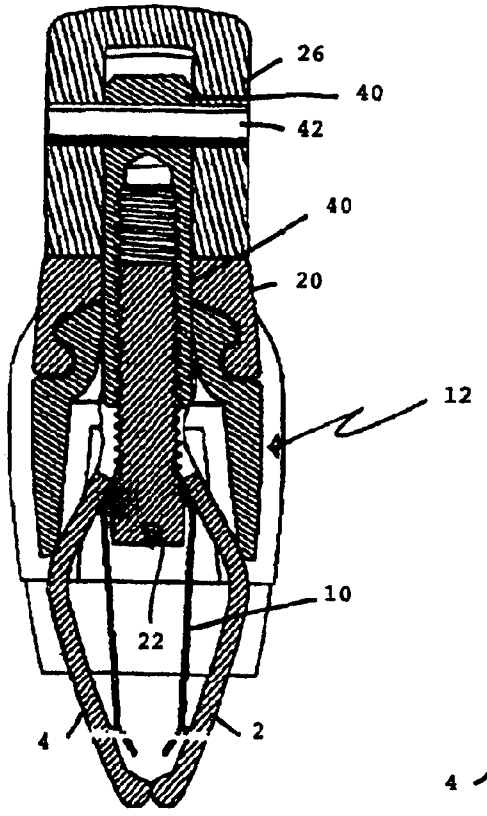
FIG. 10 is a section taken on line A—A of FIG. 8.
Figure 11:
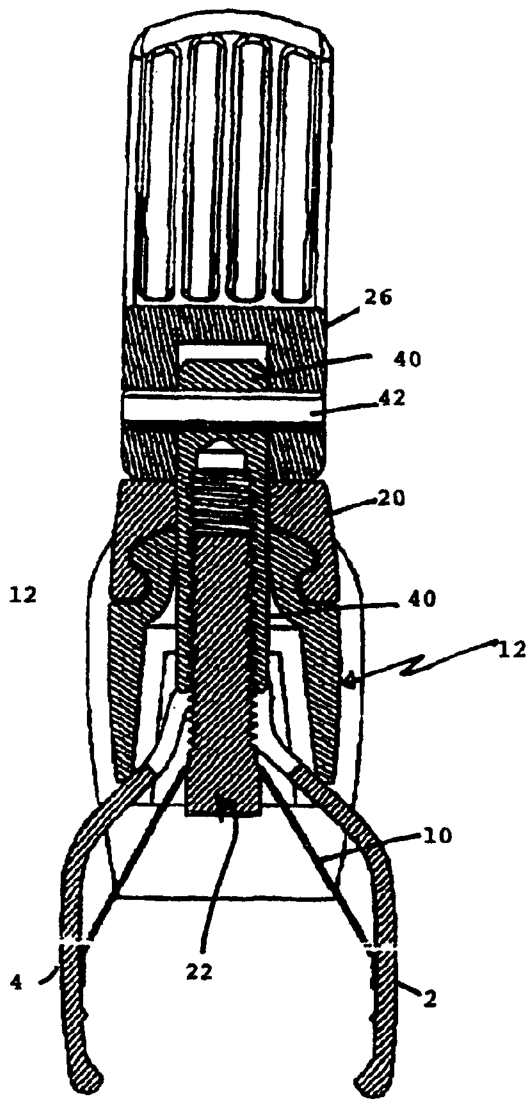
FIG. 11 is a section taken on line A—A of FIG. 9.
Figure 12:
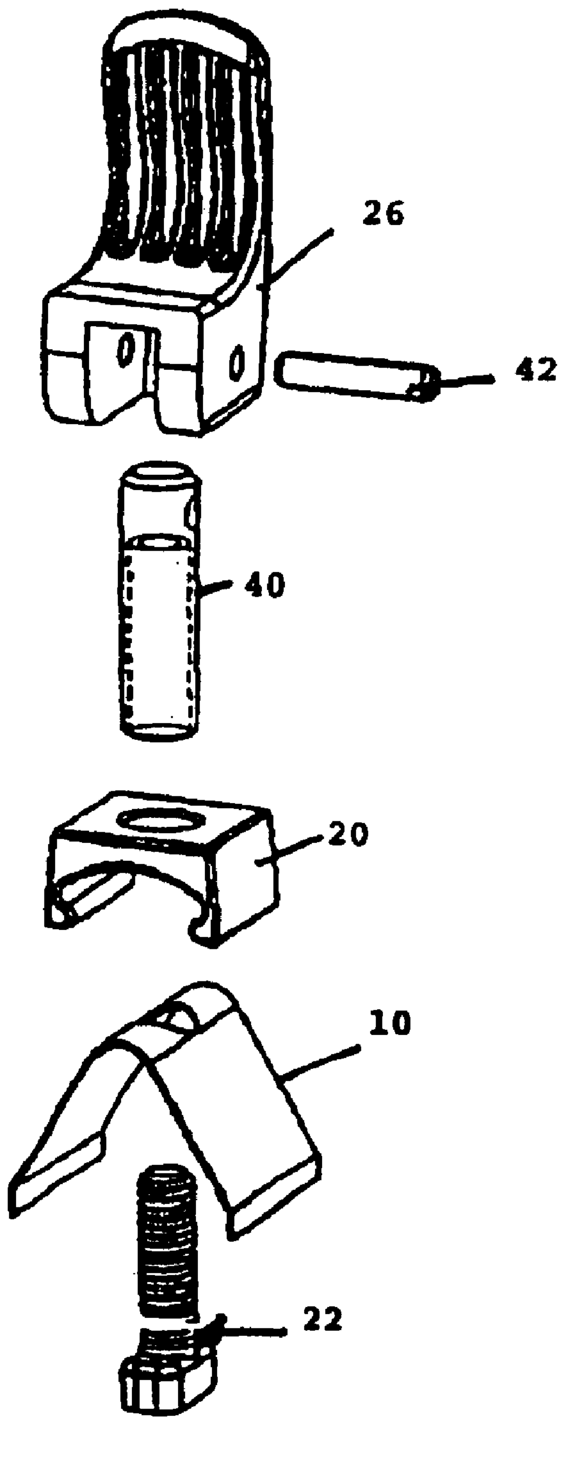
FIG. 12 is an exploded view showing the latch lever and associated components of the embodiment of FIGS. 8 to 11.

The embodiment of FIGS. 8 to 12 is very similar to that of FIGS. 1 to 7 and differs from that embodiment principally in the configuration of the latch lever in its engaged (latched) and released positions and also in the mounting of the latch bolt to the latch lever. In particular, FIGS. 8 and 10 show the latch lever 26 in the latched position and FIGS. 9 and 11 show the latch lever 26 in its released position. Movement of the latch lever 26 between these positions effects movement of the bolt 22 and hence opening and closing movement of the jaws 2, 4 in the same manner as described in connection with the first embodiment of the invention, the movement occurring as a result of the cooperation between the main body portion of the latch lever 26 and the upper surface of the mounting block 20. However in this embodiment, when the latch lever 26 is in its latched position (FIGS. 8 and 10) it is able to be rotated about the axis of the bolt 22 to facilitate final tightening of the jaws 2, 4, onto the material being clamped between the jaws 2, 4. This final tightening may require rotation of the latch lever 26 through 180° or less. To subsequently release the clamped material, all that is required is a small rotation of the latch lever 26 in the reverse direction to relieve some of the clamping pressure and then pivotal movement of the latch lever to its released position of FIGS. 9 and 11 to effect the substantive opening movement of the jaws 2, 4.

In the embodiment of FIGS. 8 to 12, the nut 28 of the first embodiment by which the bolt 22 is mounted within the latch lever 26 has been replaced by an internally-threaded sleeve 40 engaged with the threaded shank of the bolt 22. The sleeve 40 is mounted to the latch lever 26 by a pin 42 passing through an upper end portion of the sleeve above the threaded zone. This simplifies manufacture as the pivot connection between the latch lever 26 and sleeve 40 is effected by a single pin 42 inserted through aligned passages in these components. The internally-threaded sleeve 40 also permits, due to its increased thread length in relation to that of the nut 26, an increased range of adjustment of the jaws 2, 4.

In the embodiment of the FIGS. 8 to 12, the opposed sides of the channel 12 which engage the jaws 2, 4 are of a tapered configuration which provides improved strength in relation to that illustrated in FIGS. 1 to 7. Also, in this embodiment, the stop button 18 is mounted in a predetermined position on the head section of the channel 12 by means of resilient legs which are in snap-in engagement in an aperture within the top part of the head section.

Figure 13:
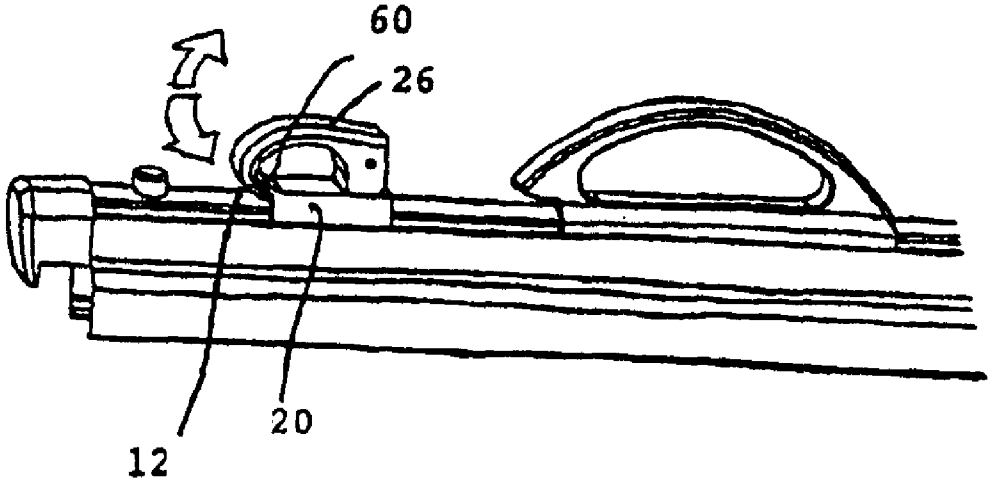
FIG. 13 is a fragmentary perspective view showing a modification of the embodiment of FIGS. 8 to 12 having provision for positively locking the latch lever in its latched condition after adjustment of the clamping pressure.
Figure 14:
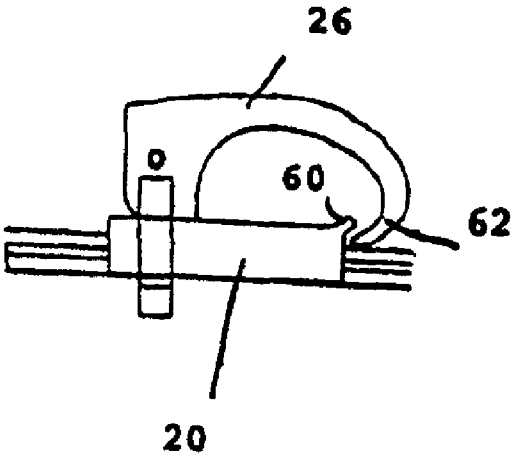
FIG. 14 is a fragmentary side view showing the latch lever configuration of FIG. 13.

FIGS. 13 and 14 show a modified version of the embodiment of FIGS. 8 to 12 in which the mounting block 20 for the latch lever 26 is of extended length to provide a lip 60 and the latch lever 26 is shaped at its distal end to provide a downwardly curved portion 62 the end of which lies beneath the lip 60 upon rotation of the lever 26 when in its latched position so that the end of the lever 26 is in longitudinal alignment with the lip 60 as shown in FIG. 13. When the end of the lever 26 and the lip 60 are so aligned with the lever end located beneath the lip 60, the lip 60 will act as an abutment or catch to prevent accidental release of the lever 26. Although this positive lock against accidental latch release is only achieved in a predetermined angular position of the latch lever 26 relative to the axis of the latch bolt, by appropriate selection of the thread pitch of the latch bolt to provide a relatively fine pitch it can be ensured that final tightening of the latch lever 26 will permit the latch lever 26 always to be moved into the angular position in which positive locking is achieved by interaction with the lip 60. It is to be understood that other locking structure provided on the latch lever 26 and mounting block 20 can be used to achieve an equivalent effect. Although in the modification shown, the lip 60 is provided only at one end of the mounting block 20 whereby there is a single position for the latch lever 26 in which it is positively locked against accidental release, in a further variation the mounting block could be configured to provide a locking lip 60 at each end, with the block being of increased length to accommodate this, whereby positive locking for the latch lever 26 can be achieved in either one of two angular positions of the latch lever 26 spaced 180° apart.

We have determined that a problem can exist with clamps currently in use in that it can sometimes be difficult to manipulate paper sheets of large size into the open mouth of the clamp. Typically, a user will hold the clamp in one hand and move a stack of sheets between the opened jaws of the clamp with the other hand. As a result, the stack may be loaded unevenly into the clamp and sheets at the bottom of the stack might be omitted and/or some or all of the sheets may be mounted in a skewed manner between the jaws whereby on closure of the jaws some or all of the sheets may be held at one end only and may fall from the clamp when mounted in a rack or other support structure for storage purposes.

Figure 15:
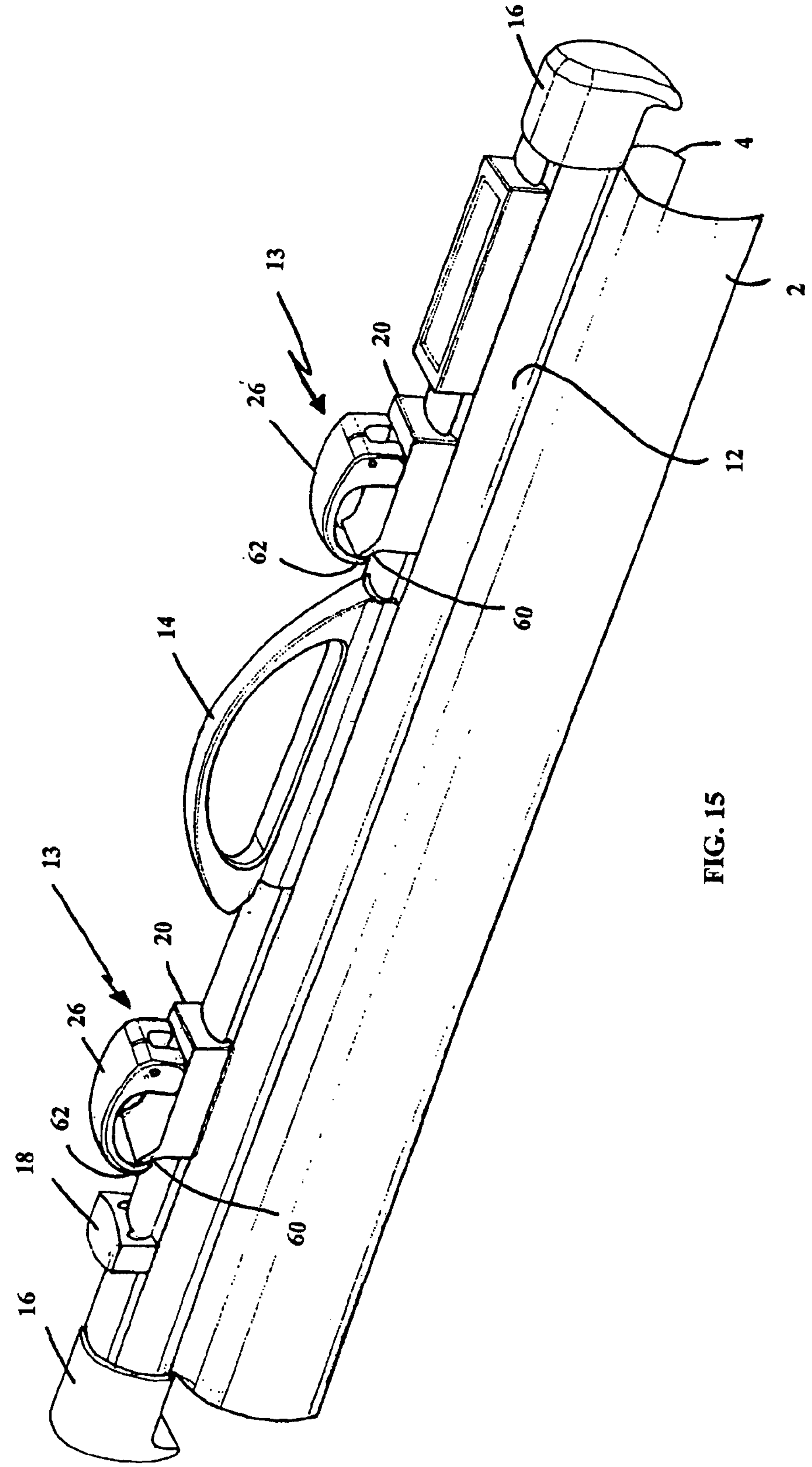
FIG. 15 is a perspective view of a clamp in accordance with another embodiment of the invention.
Figure 16:
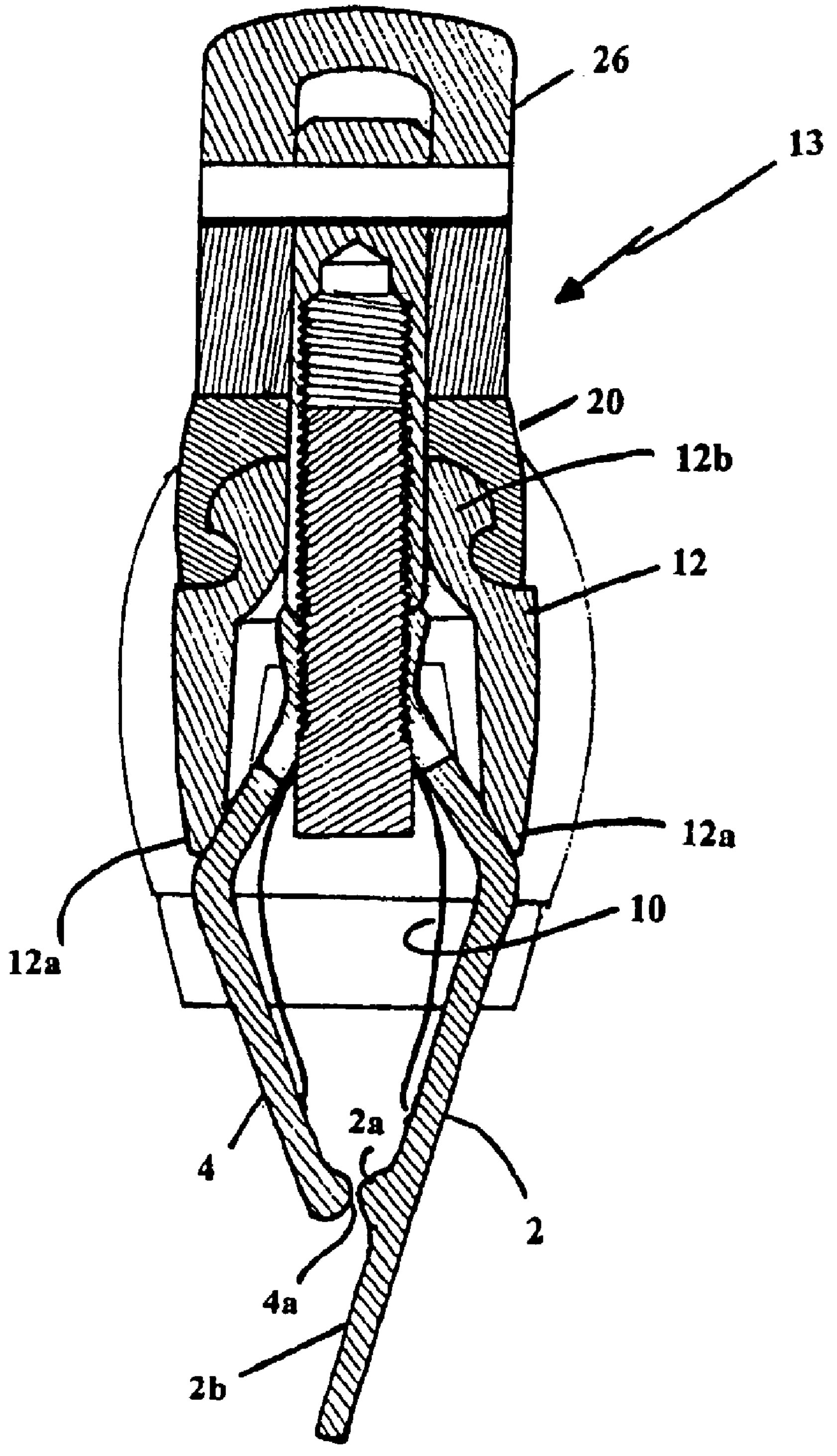
FIG. 16 is a cross-section through a latch device of the clamp of FIG. 15 showing the configuration when the jaws of the clamp are in their closed or clamping condition.
Figure 17:
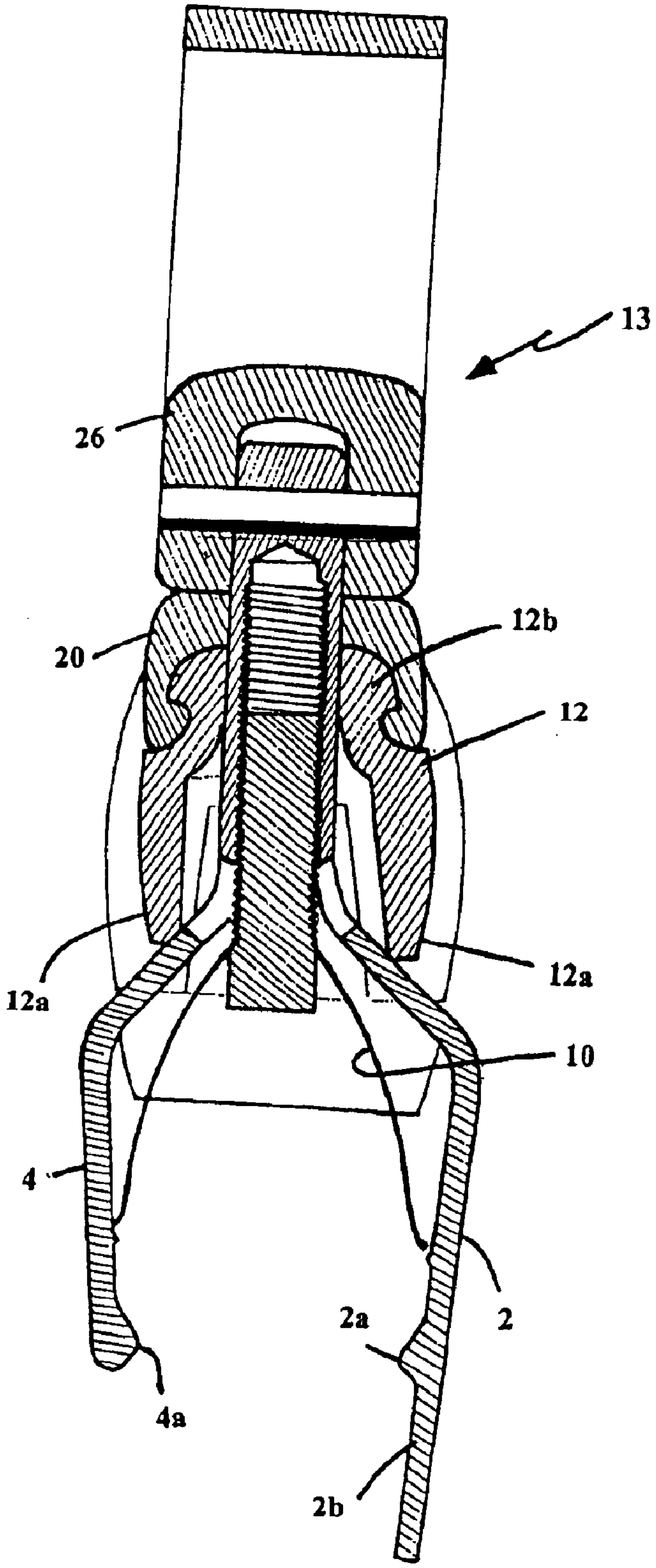
FIG. 17 is a cross-section similar to FIG. 16 but showing the jaws in their open condition.

In accordance with the embodiment of FIGS. 15 to 17, one of the two jaws (as shown the jaw 2) is provided with an integral extension **2*b* protecting downwardly beyond its clamping bead 2*a* whereas the other clamping jaw 4 terminates at its lower end with its clamping bead 4*a*. As shown the extension 2*b*** is substantially planar although in alternative constructions it may have a slight concavity in transverse section as viewed from the inside of the jaw to assist a scooping action when loading as will be described.

The extension **2*b*** provides a guide which significantly facilitates loading of the stack of sheets. With the open clamp resting on a table or other support surface, the stack of sheets can be placed or formed on the extension and when all of the sheets are in place the stack can be slid along the extension and over the clamping bead into the open jaws, the lower edge of the clamping bead being suitably shaped to facilitate smooth passage. Alternatively, the extension can act as a scoop which can be slid along the support surface to scoop up the stack of sheets. The extension does need to be of a length sufficient to facilitate loading in either of these two modes, without having excessive length. A length of approximately 15 mm to 20 mm has been found satisfactory for the purpose, with around 20 mm being particularly preferred.

The clamping jaws 2,4 are formed as extrusions and the extension can be incorporated into the associated clamping jaw at minimal additional cost.

Although this aspect has been described with reference to clamps having a latching system as disclosed in the other embodiments, it is to be understood that this aspect is also applicable to other forms of clamp involving the use of two opposed clamping jaws which are actuable for movement between open and closed positions in order to clamp sheets of paper and the like between the jaws.

It will be understood that the clamp in accordance with the preferred embodiments of the invention has facility for rapid opening and closure of the jaws achieved by a relatively small and rapid pivotal movement of the two latch levers which is amplified into a much greater movement of the jaws. The latch devices are also readily adjustable to provide a wide variation in the thickness of material which can be clamped and also of the clamping pressure. The described mounting system facilitates ease of mounting of components such as the handle and stop buttons in adjustable positions to suit different forms of mounting system.

The embodiment has been described by way of example only and modifications are possible within the scope of the invention.

Throughout this specification, unless the context requires otherwise, the word "comprise", and variations such as "comprises" or "comprising", will be understood to imply the inclusion of a stated integer or group of integers or steps but not the exclusion of any other integer or group of integers.

What is claimed is:

1. A clamp for clamping sheets and like material, said clamp comprising:

opposed elongate clamping jaws mounted for pivotal movement between a clamping condition and a relatively open, released, condition;

two latch devices for effecting movement of the jaws spaced along the length of the jaws, said latch devices comprising a latch lever pivotable between a stable latched position and a released position, said latch lever being linked to the jaws such that relatively small pivot movement of the latch lever is amplified into larger movement of the jaws, said latch devices being adjustable to accommodate variation in the thickness of material to be clamped and to permit variation of clamping pressure; and a member of channel section common to both latch devices and carrying each latch device extending along substantially the entire length of the clamp, an upper part of the jaws being mounted within the member of channel section whereby opposite sides of the member cooperate with the jaws to control movement of the jaws upon operation of the latch devices and wherein the member of channel section also provides a slidable mounting for components associated with the clamp to enable ready adjustment of the mounting positions of such components along the clamp.

2. A clamp according to claim 1, wherein the jaws are subject to a spring bias to move the jaws in an opening direction when the latch lever is moved out of its latched position.

3. A clamp according to claim 1, wherein a head section of the member is of a profile adapted for slidable engagement with a corresponding profile of a mounting part of a component to be engaged therewith.

4. A clamp according to claim 1, wherein the latch lever is linked to the jaws by means of a bolt with which a part of the latch lever is in threaded engagement, whereby when in its released position, rotation of the latch lever about the axis of the bolt will result in adjustment of the position of the bolt and thereby in the relative position between the jaws and the member of channel section, the pivotal movement of the latch lever between its latched and released positions being about an axis at right angles to the axis of the bolt.

5. A clamp according to claim 4, wherein the released position of the latch lever is also a stable position of the lever, with the latch lever moving through an over-centre position during passage between its latched and released positions.

6. A clamp according to claim 5, wherein when the latch lever is in its latched position it is capable of rotation about the axis of the bolt to effect final tightening of the jaws.

7. A clamp according to claim 1, comprising means for positively locking the latch lever against accidental release when in its latched position.

8. A clamp according to claim 7, wherein said positive locking means comprises locking formations on the latch lever and a mounting for the latch lever and which are in interlocking engagement upon rotation of the latch lever into at least one predetermined angular position relative to the mounting when the latch lever is in its latched position.

9. A clamp according to claim 4, wherein the latch lever includes an internally-threaded sleeve with which the shank of the bolt is engaged, the sleeve being pivotally mounted to a body of the latch lever for pivotal movement about an axis transverse to the axis of the threaded sleeve whereby the latch lever is able to pivot about said transverse axis for movement between its latched and released positions.

10. A clamp according to claim 1, wherein one of the jaws extends outwardly to a position substantially beyond a clamping end portion of the jaw to provide a guide surface along which material to be loaded into the clamp can slide in order to facilitate loading.

11. A clamp according to claim 10, wherein the configuration of the two jaws is such that in a fully closed condition of the jaws with the clamping portions thereof substantially in engagement without the presence of sheet material therebetween, the extension of the said one jaw is directed laterally across and transversely beyond the clamping end portion of the other jaw.

12. A clamp according to claim 11, wherein the guide surface formed by the extension is substantially planar.

13. A clamp for clamping sheets and like material, said clamp comprising;

opposed elongate clamping jaws mounted for pivotal movement between a clamping condition and a relatively open, released, condition;

a latch device for effecting movement of the jaws, said latch device comprising a latch lever pivotable between a stable latched position and a released position, said latch lever being linked to the jaws such that relatively small pivot movement of the latch lever is amplified into larger movement of the jaws, said latch device being adjustable to accommodate variation in the thickness of material to be clamped and to permit variation of clamping pressure; and means for positively locking the latch lever against accidental release when in its latched position wherein said positive locking means comprises locking formations on the latch lever and a mounting for the latch lever and which are in interlocking engagement upon rotation of the latch lever into at least one predetermined angular position relative to the mounting when the latch lever is in its latched position.

14. The clamp of claim 13, wherein the mounting for the latch lever is carried by a member of channel section within which an upper part of the jaws is mounted whereby opposite sides of the member cooperate with the jaws to control movement of the jaws upon operation of the latch device.

15. The clamp of claim 13, wherein the jaws are subject to a spring bias to move the jaws in an opening direction when the latch lever is moved out of its latched position.

16. A clamp according to claim 13, wherein there are two such latch devices spaced along the length of the jaws, with a member of channel section common to both latch devices extending along substantially the entire length of the clamp.

17. A clamp according to claim 16, wherein the member of channel section also provides a slidable mounting for components associated with the clamp to enable ready adjustment of the mounting positions of such components along the clamp.

18. A clamp according to claim 17, wherein a head section of the member is of a profile adapted for slidable engagement with a corresponding profile of a mounting part of a component to be engaged therewith.

19. A clamp according to claim 13, wherein the latch lever is linked to the jaws by means of a bolt with which a part of the latch lever is in threaded engagement, whereby when in its released position, rotation of the latch lever about the axis of the bolt will result in adjustment of the position of the bolt and thereby in the relative position between the jaws and the member of channel section, the pivotal movement of the latch lever between its latched and released positions being about an axis at right angles to the axis of the bolt.

20. A clamp according to claim 19, wherein the released position of the latch lever is also a stable position of the lever, with the latch lever moving through an over-centre position during passage between its latched and released positions.

21. A clamp according to claim 20, wherein when the latch lever is in the latched position it is capable of rotation about the axis of the bolt to effect final tightening of the jaws.

22. A clamp according to claim 19, wherein the latch lever includes an internally-threaded sleeve with which the shank of the bolt is engaged, the sleeve being pivotally mounted to a body of the latch lever for pivotal movement about an axis transverse to the axis of the threaded sleeve whereby the latch lever is able to pivot about said transverse axis for movement between its latched and released positions.

23. A clamp according to claim 13, wherein one of the jaws extends outwardly to a position substantially beyond a clamping end portion of the jaw to provide a guide surface along which material to be loaded into the clamp can slide in order to facilitate loading.

24. A clamp according to claim 23, wherein the configuration of the two jaws is such that in a fully closed condition of the jaws with the clamping portions thereof substantially in engagement without the presence of sheet material therebetween, the extension of the said one jaw is directed laterally across and transversely beyond the clamping end portion of the other jaw.

25. A clamp according to claim 24, wherein the guide surface formed by the extension is substantially planar.

26. A clamp according to claim 13, wherein the means for positively locking comprises a snap-in engagement of the latch lever with the mounting in movement to the latched position.

* * * * *